United States Patent [19]

McLarty

[11] Patent Number: 5,242,229
[45] Date of Patent: Sep. 7, 1993

[54] SEALING STRUCTURE FOR STANDARDIZED BEARING RING

[75] Inventor: Daniel R. McLarty, Burlington, Conn.

[73] Assignee: The Torrington Company, Torrington, Conn.

[21] Appl. No.: 981,965

[22] Filed: Nov. 25, 1992

[51] Int. Cl.⁵ .................................... F16C 33/76
[52] U.S. Cl. .................................... 384/484; 384/477
[58] Field of Search ............... 384/477, 478, 481, 482, 384/484–486, 504, 513, 561, 564, 569

[56] References Cited

U.S. PATENT DOCUMENTS

| | | | |
|---|---|---|---|
| 2,075,280 | 3/1937 | Green | 384/504 |
| 2,185,339 | 1/1940 | Hickling | 384/487 |
| 2,621,091 | 12/1952 | Hickling | 384/484 |
| 2,767,037 | 10/1956 | Williams | 384/482 |
| 3,071,385 | 1/1963 | Greiner | 384/484 |
| 3,245,735 | 4/1966 | Sikora | 384/482 |
| 3,494,682 | 2/1970 | Keller | 384/486 |
| 4,325,591 | 4/1982 | Otto | 384/486 |
| 4,545,692 | 10/1985 | Bras et al. | 384/477 |
| 4,798,481 | 1/1989 | Frank | 384/477 |
| 4,799,808 | 1/1989 | Otto | 384/481 |
| 5,002,406 | 3/1991 | Morton et al. | 384/477 |
| 5,005,992 | 4/1991 | Dreschmann et al. | 384/482 X |
| 5,019,118 | 5/1991 | Sakamoto | 384/482 X |
| 5,080,502 | 1/1992 | Diedrich | 384/484 X |

FOREIGN PATENT DOCUMENTS 793407  4/1958  United Kingdom ............ 384/486

Primary Examiner—Thomas R. Hannon
Attorney, Agent, or Firm—John C. Bigler

[57] ABSTRACT

A bearing shield is mountable on a bearing outer ring such that the bearing shield extends radially inward toward a standardized bearing inner ring. An inner ring insert is mountable on the inner ring such that the inner ring insert extends a predetermined axial length beyond the inner ring and is engaged by a resilient seal member fixed to the bearing shield to seal an inner ring/outer ring annulus. The inner ring, inner ring insert, and an insert spacer provide a modular inner ring assembly of a predetermined length. Optionally, the inner ring insert can provide a "slinger" or join two inner rings together to form a bearing assembly with multiple rows of rolling elements.

17 Claims, 3 Drawing Sheets

5,242,229

SEALING STRUCTURE FOR STANDARDIZED BEARING RING

BACKGROUND OF THE INVENTION

This invention relates generally to bearings with rolling elements and, more particularly, to bearing seals for rolling element bearings having a variety of inner bearing ring configurations.

Various sealing structures have been provided in rolling element bearing assemblies to retain lubricant and to exclude debris and other contaminates. In particular applications, the inner ring of such bearing assemblies may be required to have a specific axial length different from that of other applications for the same bearing size. One well known bearing assembly configuration for such applications is illustrated in FIG. 1, wherein inner ring 10 extends axially outward as axial extension portion 11 to a length greater than that of outer ring 12.

As illustrated in FIG. 1, sealing structure 14 closes annulus 16 between inner ring 10 and outer ring 12 to retain lubricant within the bearing assembly and to prevent entrance of contaminants to rolling elements 18 and bearing races of inner ring 10 and outer ring 12. In the configuration illustrated, rolling elements 18 are balls within annulus 16, separated and held by retainer (or cage) 20. Sealing structure 14 comprises a metal bearing shield (or cap) 22 and a resilient seal member 24 which is deformable against cylindrical outer portion 26 of inner ring 10, as shown.

Bearing shield 22 has an axially outwardly extending deformable lip 28. During assembly, bearing shield 22, with resilient seal member 24 bonded thereto, is positioned against shoulder 29 of outer ring 12 as shown, and a conically shaped tool is pressed axially against deformable lip 28 to flatten it into a loop configuration 30, as shown in phantom. During such deformation, loop configuration 30 is moved radially outwardly into engagement with annular groove 32 within the bore of outer ring 12 to retain bearing shield 22.

Although such sealing structure adequately retains lubricant and excludes debris, the configuration requires expensive grinding operations, special tooling to provide the "roll crimp" flattening of deformable lip 28, and, in some cases, an additional staking operation to prevent rotation of bearing shield 22 with respect to outer ring 12. Because a rolling element bearing of a particular size may be required with an inner ring 10 having a variety of axial lengths, a wide variety of inner rings must be manufactured, inventoried and processed to produce the bearing assemblies.

The foregoing illustrates limitations known to exist in present sealing structures for bearings with rolling elements. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a sealing structure for a rolling element bearing having inner and outer rings and rolling elements within an annulus between the inner and outer rings. The sealing structure comprises a bearing shield mountable on the outer ring such that the bearing shield extends radially inward toward the inner ring, resilient seal means fixed to the bearing shield for sealing the annulus, and an inner ring insert. The inner ring insert is mountable on the inner ring such that the inner ring insert extends a predetermined axial length beyond the inner ring and is engaged by the resilient seal means as a seal seat.

The foregoing and other aspects of the invention will be apparent from the following detailed description of the invention when considered with the accompanying drawing figures.

BRIEF DESCRIPTION OF THE DRAWING FIGURES

In this specification, identical elements in different embodiments are given identical reference characters.

DETAILED DESCRIPTION

Figure 2:
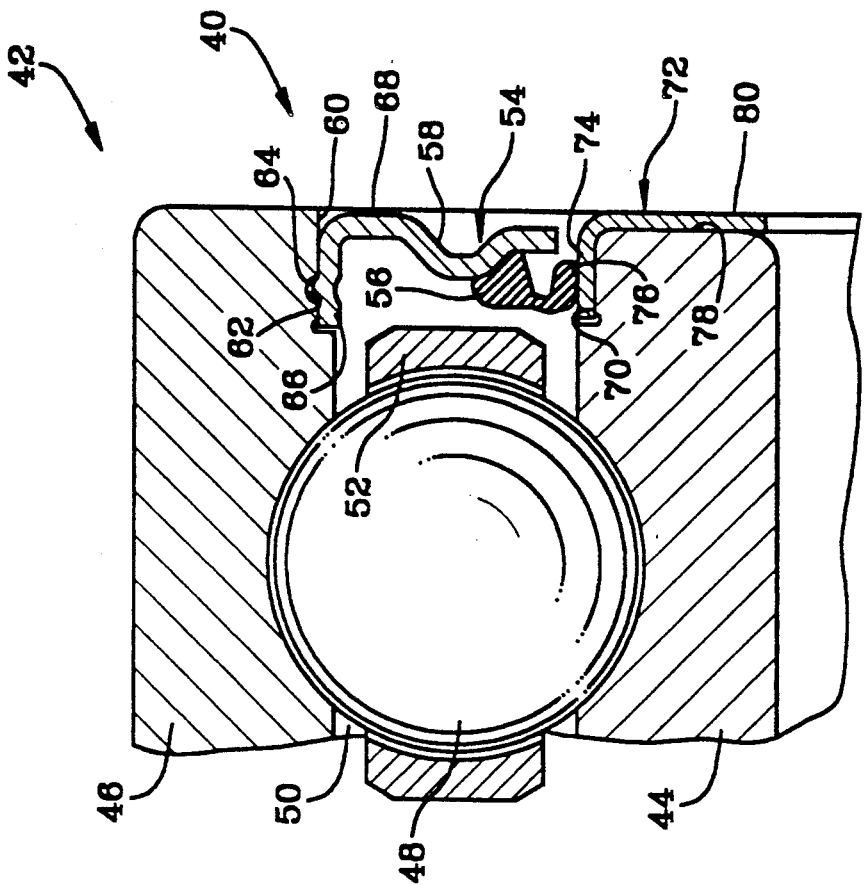
FIG. 2 is a cross sectional view of a portion of a bearing assembly illustrating one embodiment of sealing structure of the present invention as employed with a standardized bearing inner ring.

Referring now to the drawings, FIG. 2 illustrates sealing structure 40 of the present invention within bearing assembly 42. Bearing assembly 42 includes inner ring 44, outer ring 46, and rolling elements (balls) 48 within annulus 50 therebetween. Rolling elements 48 are separated and held by retainer (or cage) 52.

Bearing shield (or cap) 54 is mounted within a bore of outer ring 46 and extends radially inward toward inner ring 44. Resilient seal member 56, formed of synthetic rubber or similar material, is mounted on bearing shield 54 by bonding or other means and extends radially inward therefrom to close annulus 50. Bearing shield 54 is formed of steel or other metal by stamping or drawing operations and may include annular corrugation 58 for stiffness, resistance to inversion, and better bonding to and support of resilient seal member 56.

Bearing shield 54 may be mounted within the bore of outer ring 46 by various methods. In the embodiment of FIG. 2, bearing shield 54 is pressed into place as shown and is retained by a "snap fit". Specifically, the bore of outer ring 46 has cylindrical recessed portion 60 with annular groove 62. Bearing shield 54 has a cylindrical portion mating with recessed portion 60 and having bulge 64 resiliently biased into annular groove 62 to lock bearing shield 54 in place. Bulge 64 provides an interference fit with recessed portion 60 during assembly and may be an annular ridge or discrete protrusions, e.g. 3 protrusions at 120 degree intervals.

Bearing shield 54 extends axially inward from bulge 64 as inward lip 66 and axially outward in a cylindrical configuration to add rigidity and resist "cocking" of bearing shield 54 by engaging recessed portion 60. Significantly, bulge 64 has a curve or diameter extending beyond annular groove 62 so that sharp edges within recessed portion 60 adjacent bulge 64 are forced against or into the surface of bearing shield 54 to prevent rotation relative to outer ring 46. The engagement of the sharp edges also enhances resistance to cocking of bearing shield 54.

Alternatively, bearing shield 54 may be press-fit within recessed portion 60 without a mechanical interlock of bulge 64 and annular groove 62. In that variation, inward lip 66 and the adjacent cylindrical portion of bearing shield 54 may form an interference fit with recessed portion 60, neither bulge 64 nor annular groove 62 being provided. In the embodiment shown, bearing shield 54 extends radially inward from the axially outward end of its cylindrical portion to form face portion 68 in alignment with the end surface of outer ring 46.

Inner ring 44 has recessed portion 70 within the outer surface thereof similar to recessed portion 60. Inner ring insert 72 includes cylindrical portion 74 press-fit over recessed portion 70 with an interference fit. A land surface on cylindrical portion 74 provides a smooth seal seat for resilient seal member 58. Inner ring insert 72 is mounted on inner ring 44 before mounting of bearing shield 54. Seal member 58 includes a lip (or finger) 76 which is deflected upward from the indicated position as it is inserted with bearing shield 54 over inner ring insert 72 during assembly.

In the embodiment of FIG. 2, radially oriented end face 78 of inner ring 44 is recessed slightly with respect to face portion 68 of bearing shield 54 and the end surface of outer ring 46. Inner ring insert 72 is stamped or drawn of metal and has an L-shaped cross section extending radially inwardly from cylindrical portion 74 along end face 78 as radial face portion 80. The recessing of end face 78 and the thickness of radial face portion 80 of inner ring insert 72 are selected such that end faces of outer ring 46, bearing shield 54, and inner ring insert 72 are aligned within a common radially oriented plane.

Figure 3:
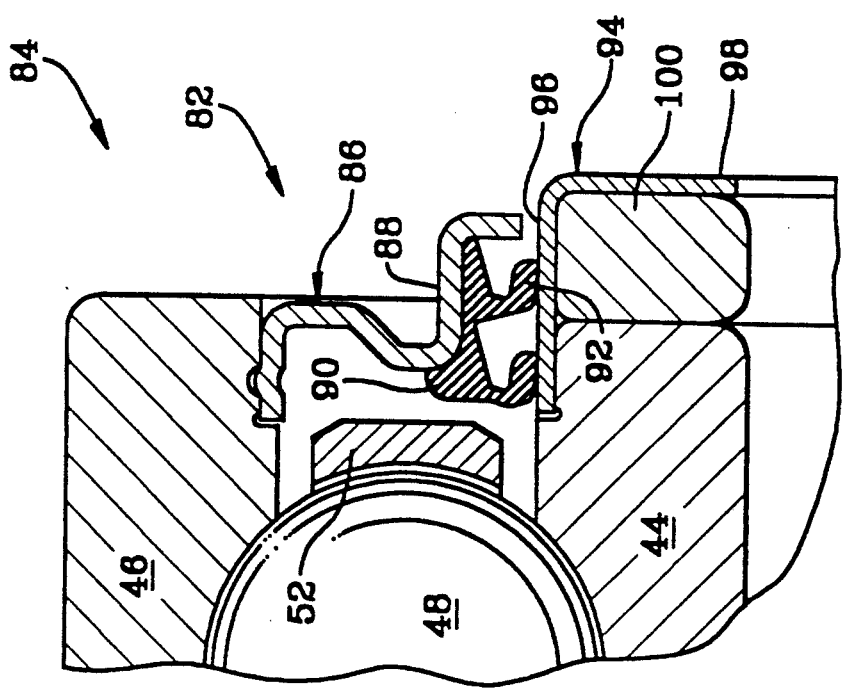
FIG. 3 is a cross sectional view of a portion of a bearing assembly illustrating a variation of the embodiment of sealing structure of FIG. 2.

FIG. 3 illustrates a variation of the embodiment of FIG. 2, indicated as sealing structure 82 within bearing assembly 84. Bearing shield 86 is similar to bearing shield 54 but includes annular corrugation 88 which extends axially outward beyond the axial end of outer ring 46. This outward extension of corrugation 88 facilitates resilient seal member 90 being larger than resilient seal member 56 such that a second lip (or finger) 92 is provided axially outward from a first lip (or finger) similar to lip 76 of FIG. 2.

Inner ring insert 94 is of L-shaped cross section similar to inner ring insert 72. However, cylindrical portion 96 of inner ring insert 94 extends axially outward to provide a seal seat for second lip 92 and to provide radial face portion 98 at a desired location spaced axially from inner ring 44. Inner ring spacer 100, or other insert support means between inner ring 44 and inner ring insert 94, provides support for inner ring insert 94 and is securely held against inner ring 44 by inner ring insert 94 to form a rigid inner ring assembly.

Significantly, the same inner ring 46 is employed in the variations of both FIGS. 2 and 3. By making inner ring spacer 100 and inner ring insert 94 of various preselected lengths, a wide range of inner ring assemblies with desired axial lengths may be provided. This construction can replace the inner rings 10 of various lengths required with the prior art sealing structure of FIG. 1. Because inner rings 10 and 46 require more complex machining and grinding operations than either inner ring spacer 100 or inner ring insert 94, substantial manufacturing cost savings can be realized from this design.

Figure 4:
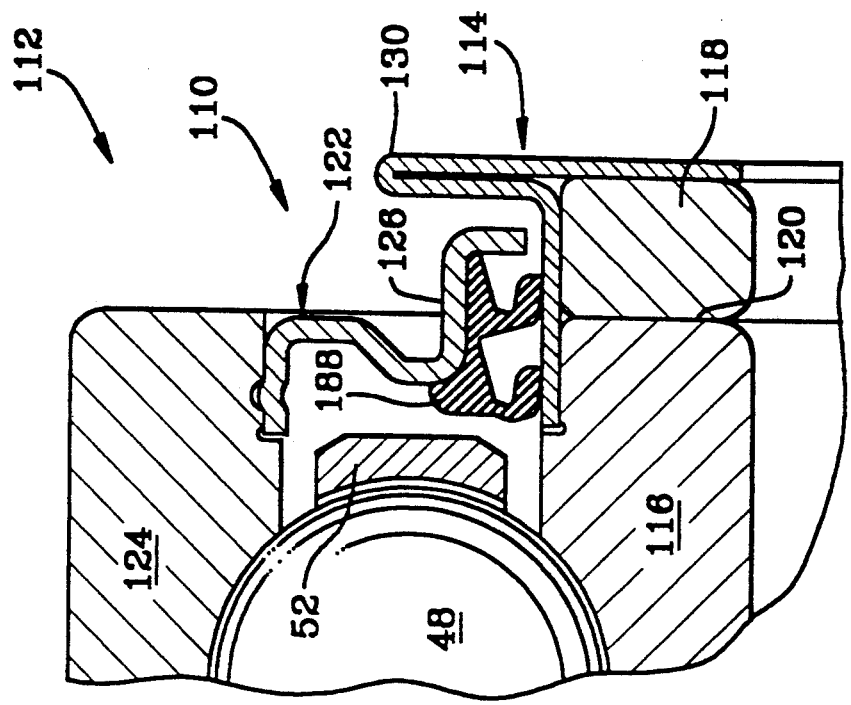
FIG. 4 is a cross sectional view of a portion of a bearing assembly illustrating a second embodiment of sealing structure of the present invention as employed with a standardized bearing inner ring.

FIG. 4 illustrates sealing structure 110 within bearing assembly 112. Bearing assembly 112 is similar to bearing assembly 42 of FIG. 2, with recesses 60, 70 and 78 omitted. Inner ring insert 114 is mounted directly on inner ring 116, inner ring spacer 118 is mounted directly against axially outward face 120 of inner ring 116, and bearing shield 122 is mounted directly against the bore of outer ring 124. Dimensions of the various elements are determined to provide the desired axial length of the inner ring assembly and to provide proper sealing.

In the embodiment of FIG. 4, bearing shield 122 is extended axially outward by annular corrugation 126 to support resilient seal member 128 similar to seal member 90 of FIG. 3 with two lips (or fingers). Inner ring insert 114 is axially outward of inner ring 116 and extends radially outward from inner ring 116 to form an annular surface 130 that serves as a "slinger" or "flinger" to throw dirt away from bearing assembly 112. In the embodiment shown, inner ring insert 114 is folded back on itself at annular surface 130 to form a T-shaped cross section.

Figure 5:
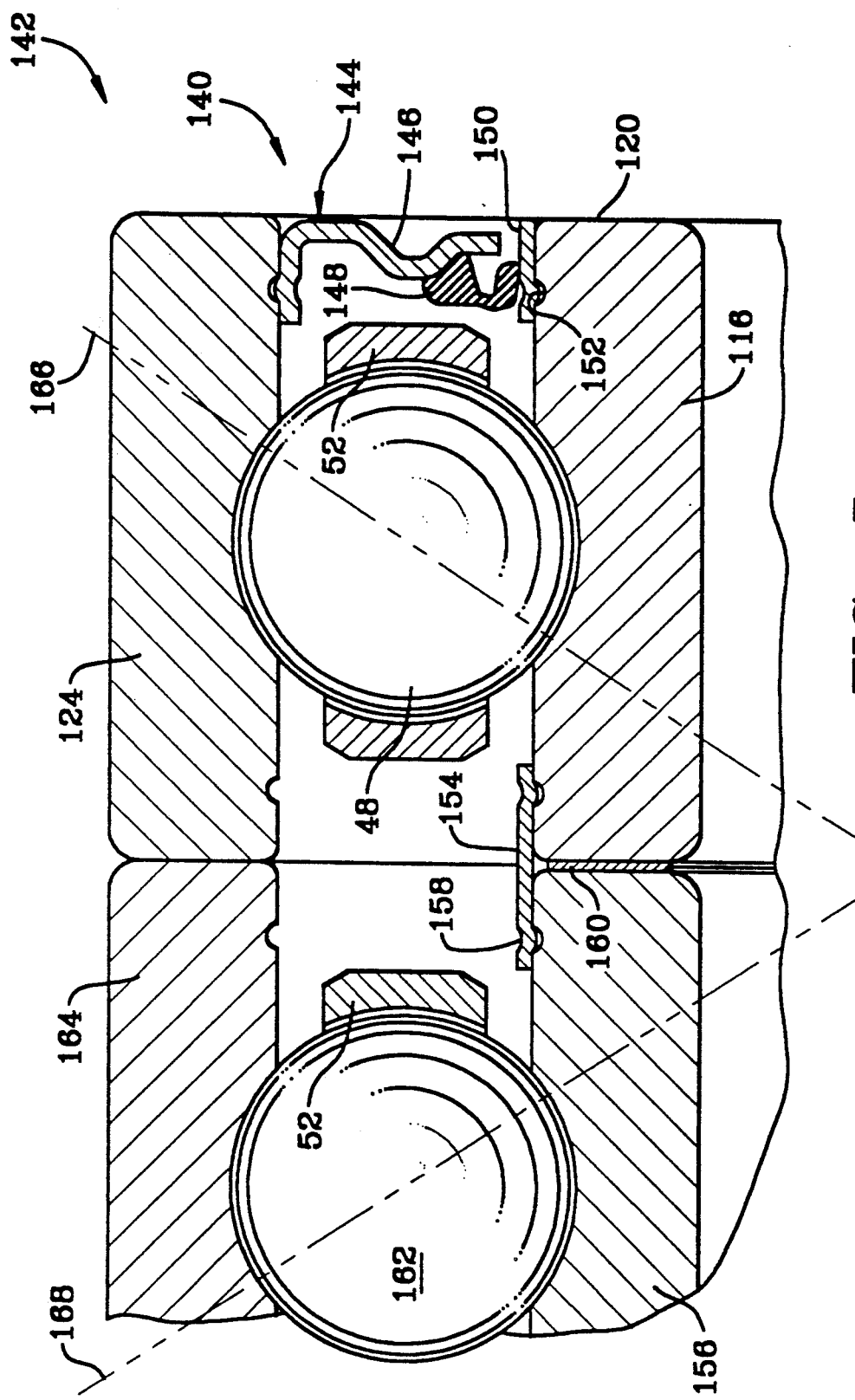
FIG. 5 is a cross sectional view of a portion of a bearing assembly illustrating a variation of the embodiment of sealing structure of FIG. 4.

A variation of the embodiment of FIG. 4 is shown in FIG. 5, wherein sealing structure 140 is provided within bearing assembly 142. Sealing structure 140 is similar to sealing structure 110 but has bearing shield 144 with annular corrugation 146 adapted to support resilient seal member 148 with a single seal lip (or finger). Inner ring insert 150 is cylindrical in configuration and includes at least one protrusion engaging annular groove 152 in the outer surface of inner ring 116 to provide a mechanical interlock.

Second inner ring insert 154 is similar to inner ring insert 150 but extends a longer axial distance to facilitate joining of two inner rings to form a bearing assembly with multiple rows of rolling elements, as shown. Specifically, second inner ring 156, identical to inner ring 116, is joined to inner ring 116 by second inner ring insert 154. Mounting of this insert upon second inner ring 156 is by mechanical interlock with groove 158 and upon inner ring 116 by press-fit or sliding fit.

The standardized inner rings 116 and 156 may be separated by a preload shim 160 to provide preloading of two rows of rolling elements, indicated as rolling element 48 and second rolling element (ball) 162. Second outer ring 164 is identical to outer ring 124, both having the same axial length as inner rings 116 and 156. Due to the spacing provided by preload shim 160, a preload force indicated by lines 166 and 168 is created when outer rings 124 and 164 are clamped together in the axial direction. Second inner ring insert 15 holds bearing assembly 142 together prior to installation.

Figure 1:
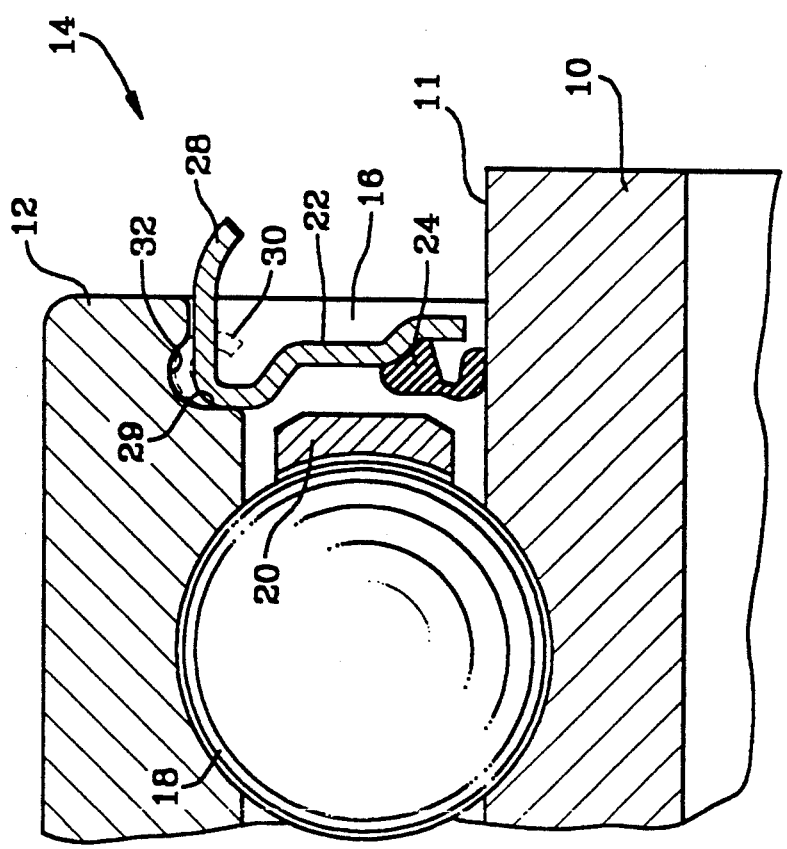
FIG. 1 is a cross sectional view of a portion of a bearing assembly with rolling elements illustrating a prior art sealing structure.

From the above description, it will be apparent that the present invention provides a sealing structure that requires less material removal from the outer ring than the prior art configuration of FIG. 1. The sealing structure results in improved seal seat concentricity and lower cost, due to the suitability for through feed grinding and the reduced area requiring grinding. Assembly of the bearing shield and inner ring insert can be a "snap-in" procedure with simplified tooling pressing a bulge (or protrusion) of the bearing shield or inner ring snapping into a machined groove in the outer or inner ring, respectively.

The bearing shield and inner ring inserts can be stamped or drawn from steel or other sheet metal. Due to the reduced material removal, the outer ring can be made more rigid. The bearing shield can be made with less inner ring clearance because of the improved concentricity of the mounting on the outer ring. Also, the bearing shield and inner ring insert may be mounted in a recess in the outer ring bore and inner ring outer surface, respectively, formed during the plunge grinding operation which forms the corresponding outer and inner raceways.

Significantly, the present invention provides versatility that reduces inventory requirements. An optional inner ring insert spacer combines with the inner ring insert and inner ring to form a modular inner ring assembly that replaces inner rings of various lengths. Because the inner ring insert and insert spacer can be manufactured with less costly machining and grinding operations than inner rings with assorted axial lengths, the modular construction results in substantial cost savings without a reduction in bearing assembly performance.

Although the invention has been particularly shown and described with reference to preferred embodiments, it will be understood by those skilled in the art that the foregoing and other changes in form and details may be made therein without departing from the spirit and scope of the invention, as defined by the claims appended hereto.

Having described the invention, what is claimed is:

1. A sealing structure for a rolling element bearing having inner and outer rings and rolling elements within an annulus between the inner and outer rings, the sealing structure comprising:
   a bearing shield mountable on the outer ring such that the bearing shield extends radially inwardly toward the inner ring;
   resilient seal means fixed to the bearing shield for sealing the annulus;
   an inner ring insert mountable on the inner ring such that the inner ring insert extends a predetermined axial length beyond the inner ring and is engaged by the resilient seal means as a seal seat; and
   insert support means between the inner ring and the inner ring insert for supporting an extension portion of the inner ring insert extending axially beyond the inner ring.

2. The sealing structure according to claim 1, wherein the inner ring insert is L-shaped in cross section and comprises a cylindrical portion providing the seal seat and a radially oriented portion providing an end face.

3. The sealing structure according to claim 1, wherein the resilient seal means includes multiple lips engageable with the inner ring insert to provide multiple seal barriers.

4. The sealing structure according to claim 1, wherein the inner ring insert is mountable upon a cylindrical outside surface of the inner ring.

5. The sealing structure according to claim 1, wherein the inner ring insert includes at least one protrusion extending radially inward to provide a mechanical interlock by engaging an annular groove in the outside surface of the inner ring.

6. The sealing structure according to claim 1, wherein the inner ring insert extends axially outward and radially outward with respect to the inner ring to provide an annular surface serving as a slinger.

7. The sealing structure according to claim 1, wherein the outer race includes a bore having an annular groove and the bearing shield includes at least one protrusion extending radially outward to provide a mechanical interlock by engaging the annular groove in the bore of the outer ring.

8. A sealing structure for a rolling element bearing having inner and outer rings and rolling elements within an annulus between the inner and outer rings, the sealing structure comprising:
   a bearing shield mountable on the outer ring such that the bearing shield extends radially inwardly toward the inner ring;
   resilient seal means fixed to the bearing shield for sealing the annulus;
   an inner ring insert mountable on the inner ring such that the inner ring insert extends a predetermined axial length beyond the inner ring and is engaged by the resilient seal means as a seal seat; and
   an inner ring spacer between a radially oriented portion of the inner ring insert and the inner ring such that the inner ring spacer provides support for the inner ring insert and spaces a radially oriented end portion of the inner ring insert a predetermined axial distance from the inner ring.

9. A rolling element bearing comprising:
   an outer ring;
   an inner ring;
   rolling elements within an annulus between the outer ring and the inner ring; and
   an inner ring insert mounted on the inner ring such that the inner ring insert extends a predetermined axial length beyond the inner ring; and
   insert support means between the inner ring and the inner ring insert for supporting the inner ring insert such that the inner ring insert provides a predetermined axial extension of the inner ring.

10. The rolling element bearing according to claim 9, further comprising resilient seal means engageable with the inner ring insert to close the annulus between the outer ring and the inner ring to provide a seal for the bearing.

11. The rolling element bearing according to claim 10, wherein the resilient seal means includes multiple lips engageable with the inner ring insert to provide multiple seal barriers.

12. The rolling element bearing according to claim 10, further comprising a bearing shield mounted on the outer ring such that the bearing shield extends radially inward toward the inner ring, the resilient seal means being mounted on the bearing shield.

13. The rolling element bearing according to claim 9, wherein the inner ring insert is L-shaped in cross section and comprises a cylindrical portion overlying the inner ring and a radially oriented portion providing an end face.

14. The rolling element bearing according to claim 9, wherein the inner ring insert is mountable upon a cylindrical outside surface of the inner ring.

15. The rolling element bearing according to claim 9, wherein the inner ring insert includes at least one protrusion extending radially inward to provide a mechanical interlock by engaging an annular groove in the outside surface of the inner ring.

16. The rolling element bearing according to claim 9, wherein the inner ring insert extends axially outward and radially outward with respect to the inner ring to provide an annular surface serving as a slinger.

17. A rolling element bearing comprising:

an outer ring;

an inner ring;

rolling elements within an annulus between the outer ring and the inner ring; and an inner ring insert mounted on the inner ring such that the inner ring insert extends a predetermined axial length beyond the inner ring; and an inner ring spacer between a radially oriented portion of the inner ring insert and the inner ring such that the inner ring spacer provides support for the inner ring insert and spaces a radially oriented end portion of the inner ring insert a predetermined axial distance from the inner ring.

* * * * *